(12) United States Patent
Kurokawa

(10) Patent No.: US 10,184,525 B2
(45) Date of Patent: Jan. 22, 2019

(54) METHOD OF MANUFACTURING CROSS SHAFT UNIVERSAL JOINT

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 232 days.

(21) Appl. No.: 14/900,254

(22) PCT Filed: Aug. 20, 2014

(86) PCT No.: PCT/JP2014/071799
§ 371 (c)(1),
(2) Date: Dec. 21, 2015

(87) PCT Pub. No.: WO2015/029857
PCT Pub. Date: Mar. 5, 2015

(65) Prior Publication Data
US 2016/0153502 A1   Jun. 2, 2016

(30) Foreign Application Priority Data

| Aug. 30, 2013 | (JP) | 2013-178822 |
| Jan. 6, 2014 | (JP) | 2014-000109 |
| Apr. 9, 2014 | (JP) | 2014-079904 |
| May 27, 2014 | (JP) | 2014-108656 |

(51) Int. Cl.
*F16D 3/41* (2006.01)
*F16D 3/40* (2006.01)
*F16D 3/38* (2006.01)

(52) U.S. Cl.
CPC .............. *F16D 3/40* (2013.01); *F16D 3/385* (2013.01); *F16D 3/41* (2013.01); *F16D 2300/12* (2013.01); *Y10T 29/49895* (2015.01)

(58) Field of Classification Search
CPC ... F16D 3/40; F16D 3/385; F16D 3/41; F16D 2300/12; Y10T 29/49895
See application file for complete search history.

(56) References Cited

U.S. PATENT DOCUMENTS 4,050,130 A   9/1977   Pitner

FOREIGN PATENT DOCUMENTS

| DE | 2616020 A1 | 10/1977 |
| JP | 2-29322 U | 2/1990 |
| JP | 8-135674 A | 5/1996 |
| JP | 9-60650 A | 3/1997 |

(Continued)

OTHER PUBLICATIONS

Communication dated Apr. 13, 2016, issued by the European Patent Office in counterpart European Patent Application No. 14839006.5.

(Continued)

*Primary Examiner* — Sarang Afzali
*Assistant Examiner* — Ruth G Hidalgo-Hernandez
(74) *Attorney, Agent, or Firm* — Sughrue Mion, PLLC

(57) ABSTRACT

A pin is made of a synthetic resin having an appropriate thermal expansion rate and a low friction coefficient. At a state where respective members configuring a cross shaft universal joint are assembled, a tip portion of the pin is heated and softened, and one yoke is pivotally displaced relative to other yoke. Thereby, it is possible to set a fitting margin of the pin to a bottom inner surface of a bearing cup to an appropriate size and to adjust a shape of an end surface of the pin.

8 Claims, 17 Drawing Sheets

(56) References Cited

FOREIGN PATENT DOCUMENTS

| | | |
|---|---|---|
| JP | 2004-36827 A | 2/2004 |
| JP | 2004-68871 A | 3/2004 |
| JP | 2004-278790 A | 10/2004 |
| JP | 2006-250197 A | 9/2006 |
| JP | 2008-39119 A | 2/2008 |
| JP | 2009-41732 A | 2/2009 |

OTHER PUBLICATIONS

Search Report dated Oct. 28, 2014, issued by the International Searching Authority in counterpart International Application No. PCT/JP2014/071799 (PCT/ISA/210).

Written Opinion dated Oct. 28, 2014, issued by the International Searching Authority in counterpart International Application No. PCT/JP2014/071799 (PCT/ISA/237).

METHOD OF MANUFACTURING CROSS SHAFT UNIVERSAL JOINT

TECHNICAL FIELD

The present invention relates to a method of manufacturing a cross shaft universal joint for coupling rotary shafts, for example, configuring a steering apparatus of an automobile so that torque can be transmitted.

BACKGROUND ART

A steering apparatus of an automobile is configured as shown in FIG. 12. The motion of a steering wheel 1 operated by a driver is transmitted to an input shaft 6 of a steering gear unit 5 through a steering shaft 2, a universal joint 3a, an intermediate shaft 4 and another universal joint 3b. A pair of tie rods 7, 7 is pushed or pulled by a rack and pinion mechanism installed in the steering gear unit 5, so that an appropriate steering angle is applied to a pair of left and right steering wheels, in conformity to an operation amount of the steering wheel 1.

FIG. 13 illustrates an example of the intermediate shaft 4 that is mounted to the steering apparatus as described above. In this example, the intermediate shaft 4 is configured to expand and contract so as to prevent the steering wheel 1 from being pushed towards the driver upon a collision accident. The intermediate shaft 4 includes an inner shaft 9 having a male spline part 8 provided on an outer periphery of a tip portion (a left end portion in FIG. 13) thereof, and a circular tube-shaped outer tube 11 having a female spline part 10 formed on an inner periphery thereof to which the male spline part 8 can be inserted. The male spline part 8 and the female spline part 10 are spline-engaged with each other, so that the inner shaft 9 and the outer tube 11 are combined to be expandable and contractible. Also, base end portions of yokes 12a, 12b configuring the universal joints 3a, 3b are welded and fixed to base end portions of the inner shaft 9 and the outer tube 11, respectively.

FIGS. 14 and 15 illustrate a first example of a known universal joint, which can be used as the universal joints 3a, 3b and is illustrated in Patent Documents 1 and 2. In the meantime, the structure shown in FIGS. 14 and 15 is a so-called vibration preventing joint configured to prevent vibration transmission. However, a universal joint, which is a subject of the present invention, is not necessarily required to have a vibration preventing structure. Therefore, in the below, the vibration preventing structure is omitted and a main body structure of the universal joint 3 is described.

The universal joint 3 is configured by coupling a pair of bifurcated yokes 12a, 12b made of a metal material having sufficient stiffness through a cross shaft 13 made of hard metal such as alloy steel such as bearing steel so that torque can be transmitted. Both yokes 12a, 12b have base parts 14, 14, respectively, and each of yokes 12a, 12b has a pair of coupling arm parts 15, 15. Both base parts 14, 14 are configured to support and fix the base end portion of the inner shaft 9 or outer tube 11 (which is a rotary shaft) (or a front end portion of the steering shaft 2 or a rear end portion of the input shaft 6, refer to FIG. 12) so that the torque can be transmitted. Tips of the coupling arm parts 15, 15 are respectively formed with circular holes 16, 16 to be concentric each other, for each of the yokes 12a, 12b. Cylindrical bearing cups 17, 17 made of a plate material of hard metal such as bearing steel and case-hardening steel to have a bottom are fastened and fitted with openings thereof facing each other to the respective circular holes 16, 16, so that they are internally fitted. The cross shaft 13 has such a shape that intermediate parts of a pair of column parts are orthogonal to each other, and has four shaft parts 18, 18 each of which has a cylindrical shape. That is, base end portions of the respective shaft parts 18, 18 are coupled and fixed to four positions (at a state where center axes of the adjacent shaft parts 18, 18 are orthogonal to each other) equally spaced in a circumferential direction of a coupling base part 19 provided at a center part of the cross shaft. The center axes of the respective shaft parts 18, 18 exist on the same plane.

The shaft parts 18, 18 are inserted from axial intermediate parts to tip portions thereof in the respective bearing cups 17, 17. A plurality of needles 20, 20 each of which is a rolling body are arranged between inner peripheries of the respective bearing cups 17, 17 and outer peripheries of the tip portions of the respective shaft parts 18, 18, so that radial bearings 21, 21 are configured and both the yokes 12a, 12b can be pivotally displaced relative to the cross shaft 13 by small force. With this configuration, even when the center axes of both the yokes 12a, 12b do not coincide with each other, the rotational force can be transmitted between both the yokes 12a, 12b with transmission loss being suppressed.

According to the universal joint 3 as described above, center parts of the respective shaft parts 18, 18 are formed with bottomed insertion holes 22, 22 with being opened towards end surfaces of the respective shaft parts 18, 18 in axial directions of the respective shaft parts 18, 18. In the respective insertion holes 22, 22, pins 23, 23 made of a synthetic resin are inserted, respectively. The respective pins 23, 23 are supported between the respective bearing cups 17, 17 and the respective shaft parts 18, 18 to prevent the respective bearing cups 17, 17 from rattling relative to the respective shaft parts 18, 18 and both the yokes 12a, 12b from rattling relative to the cross shaft 13 and to prevent distances between the opening end portions of the respective bearing cups 17, 17 and the coupling base part 19 from being excessively narrowed. That is, in the case of the universal joint 3b, which is mounted at an outside (at a lower side in FIG. 12) of a vehicle interior, of the universal joints 3a, 3b configuring the steering apparatus shown in FIG. 12, seal rings 24, 24 are respectively provided between the base end portions of the respective shaft parts 18, 18 configuring the cross shaft 13 and the openings of the respective bearing cups 17, 17. In this example, the respective pins 23, 23 are provided to prevent the endurance of the respective seal rings 24, 24 from being lowered due to the excessive compression of the respective seal rings 24, 24 and to prevent the sealing characteristics of the respective seal rings 24, 24 from being deteriorated due to the excessive lowering of the compression amounts of the respective seal rings 24, 24.

FIGS. 16, 17A and 17B illustrate a second example of the structure of the known universal joint, which is disclosed in Patent Document 3. In the second example, a thrust piece 25 having a substantially disc shape and made of an elastic synthetic resin is interposed between a bottom inner surface of the bearing cup 17 configuring the radial bearing 21 and an end surface of a shaft part 18a configuring a cross shaft 13a, as shown in FIGS. 17A and 17B. In the second example, the thrust piece 25 is supported between the bottom inner surface of the bearing cup 17 and the end surface of the shaft part 18a, so that the rattling of the yoke 12 relative to the cross shaft 13a can be prevented.

In either structure, the pin 23 or thrust piece 25 is supported between the bearing cup 17 and the shaft parts 18, 18a, so that the rattling of the yokes 12, 12a, 12b relative to the cross shafts 13, 13a can be prevented. However, there is still room for improvement on the function of suppressing the rattling of the pair of yokes relative to the cross shaft while suppressing an increase in the manufacturing cost. That is, in order to suppress the rattling of both the yokes relative to the cross shaft, it may be conceivable of enlarging a fitting margin of the thrust piece to the bearing cup and the shaft part of the cross shaft. However, when the fitting margin is simply enlarged, a rotational resistance (pivotal resistance) of both the yokes relative to the respective shaft parts is increased. Therefore, in order to prevent the increase in the rotational resistance while suppressing the rattling, it is necessary to form the thrust piece (or pin and insertion hole) with high precision and to enhance the assembling precision (an insertion amount of the shaft part into the bearing cup) of the cross shaft and the yoke, which increase the manufacturing cost of the cross shaft universal joint.

PRIOR ART DOCUMENT

Patent Document

Patent Document 1: JP-A-H08-135674
Patent Document 2: JP-A-H09-60650
Patent Document 3: JP-A-2006-250197

SUMMARY OF THE INVENTION

Problem to be Solved

It is therefore an object of the present invention to provide a method of manufacturing a cross shaft universal joint capable of improving a function of suppressing rattling of a yoke relative to a cross shaft while suppressing an increase in manufacturing cost.

Means for Solving the Problem

According to the present invention, there is provided a method of manufacturing a cross shaft universal joint including a pair of yokes, a cross shaft, four radial bearings and four thrust pieces,
wherein each of the pair of yokes includes a base part for coupling and fixing an end portion of a rotary shaft, a pair of coupling arm parts extending axially from two diametrically opposite positions of the rotary shaft at one axial end edge of the base part, and a pair of circular holes formed at tip portions of the pair of coupling arm parts to be concentric with each other,
wherein the cross shaft is configured by radially fixing four shaft parts on an outer periphery of a coupling base part thereof,
wherein each of the radial bearings is arranged between an inner periphery of a cylindrical bottomed bearing cup fitted and fixed in a corresponding circular hole and an outer periphery of a corresponding shaft part, and is configured to support a radial load applied between the corresponding bearing cup and the corresponding shaft part, and
wherein each of the thrust pieces is made of a synthetic resin and arranged between a bottom inner surface of a corresponding bearing cup and a corresponding shaft part, the method including:
when assembling the cross shaft universal joint, heating and deforming at least one of the thrust pieces to adjust a size of the thrust piece in an axial direction of a corresponding shaft part.

Specifically, in a first aspect, at a state where the pair of yokes, the cross shaft, the respective radial bearings and the respective thrust pieces are assembled, the at least one of the thrust pieces is heated and deformed to adjust the size of the thrust piece in the axial direction of the shaft part.

Further, in a second aspect, at a state before the at least one of the thrust pieces is arranged between the bearing cup and the shaft part, the shaft part to which the thrust piece is arranged is heated, and the thrust piece and the shaft part are assembled, and thereafter, the bearing cup and the shaft part are assembled, so that the thrust piece is heated and deformed to adjust the size of the thrust piece in the axial direction of the shaft part.

Further, in a third aspect, at a state before the respective bearing cups and the cross shaft are assembled, the at least one of the thrust pieces and the bearing cup to which the thrust pieces is arranged are heated, and thereafter, the respective bearing cups and the cross shaft are assembled, so that the thrust piece is deformed to adjust the size of the thrust piece in the axial direction of the shaft part.

When performing the above-described method of manufacturing the cross shaft universal joint, preferably, the thrust piece has a fitting margin to the bearing cup and the shaft part, and a size of the fitting margin at a state before the thrust piece is heated is larger than that of the fitting margin after the heating.

Further, preferably, a center part of either one of an end surface of the thrust piece and a surface facing the end surface is provided with a convex portion, and a center part of the other surface is provided with a concave portion, and center axes of the shaft part and the radial bearing are aligned based on engagement between the convex portion and the concave portion.

Further, preferably, at a state where the thrust piece is heated and the convex portion and the concave portion are engaged with each other, one yoke of the pair of yokes is pivotally displaced relative to the other yoke.

Further, preferably, the thrust piece is arranged between the bottom inner surface of the bearing cup and an end surface of the shaft part, and the thrust piece has a substantially disc shape having an outer surface of a partially spherical shape conforming to the bottom inner surface of the bearing cup and an inner surface of a circular truncated conical shape inclined in a direction in which an outer diameter is gradually decreased towards a tip thereof.

Further, preferably, the thrust piece is arranged between the bottom inner surface of the bearing cup having a convex portion provided at a center part thereof and an end surface of the shaft part having a concave portion provided at a center part thereof, and the thrust piece has a substantially disc shape having an outer surface of which a center part is formed with a concave portion to be engaged with the convex portion of the bottom inner surface of the bearing cup and an inner surface of which a center part is formed with a convex portion to be engaged with the concave portion of the end surface of the shaft part Effects of the Invention According to the manufacturing method of the cross shaft universal joint of the present invention, when assembling the cross shaft universal joint, at least one of the thrust pieces is heated and deformed to adjust the size of the thrust piece in the axial direction of the shaft part.

Therefore, it is possible to provide the cross shaft universal joint capable of suppressing the rattling of the pair of yokes relative to the cross shaft while suppressing the manufacturing cost without excessively increasing shape precision and size precision of the thrust piece and assembly precision of the cross shaft and both yokes.

BRIEF DESCRIPTION OF THE DRAWINGS

FIGS. 17A and 17B illustrate a thrust piece of FIG. 16, wherein FIG. 17A is a plan view, and FIG. 17B is a sectional view taken along a line XVII-XVII of FIG. 17A.

DETAILED DESCRIPTION OF EMBODIMENTS

First Embodiment

Figure 1:
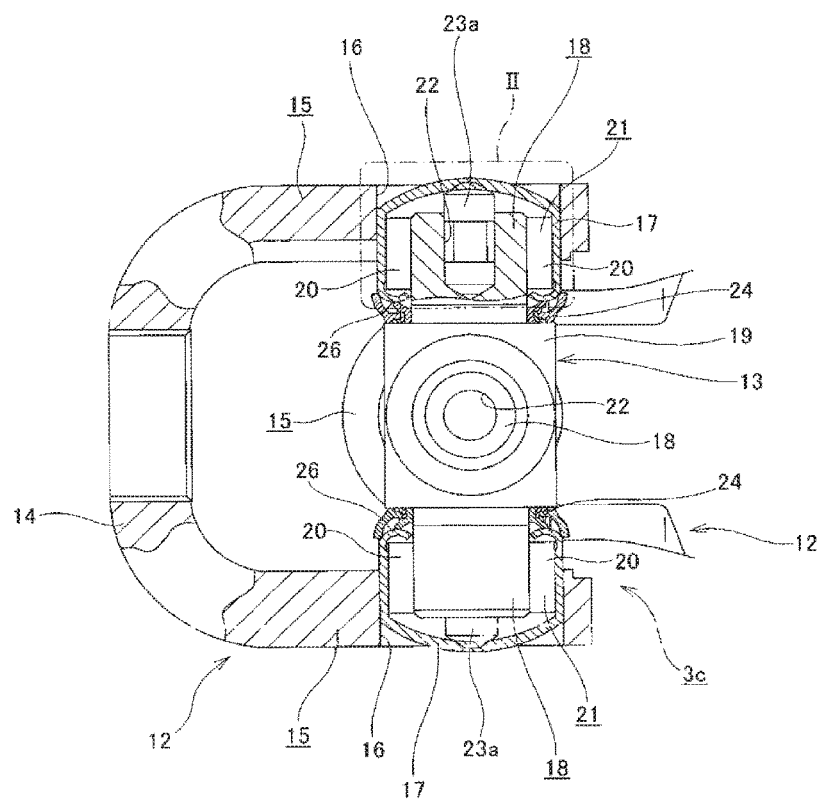
FIG. 1 is a partial cut side view of a universal joint, illustrating a first embodiment of the present invention.
Figure 2:
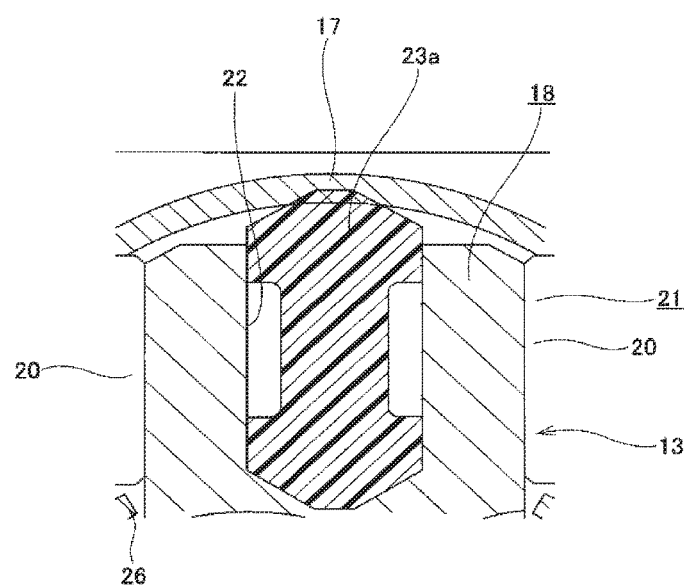
FIG. 2 is an enlarged sectional view of a section II in FIG. 1, in which a pin is shown with being cut.

FIGS. 1 and 2 illustrate a first embodiment of the present invention. Meanwhile, in the below descriptions, regarding the structure equivalent to the know structure including the structure shown in FIGS. 13 to 16, the overlapped illustrations and descriptions are omitted or simplified. Hereinafter, features of the present invention will be focused and described.

Figure 14:
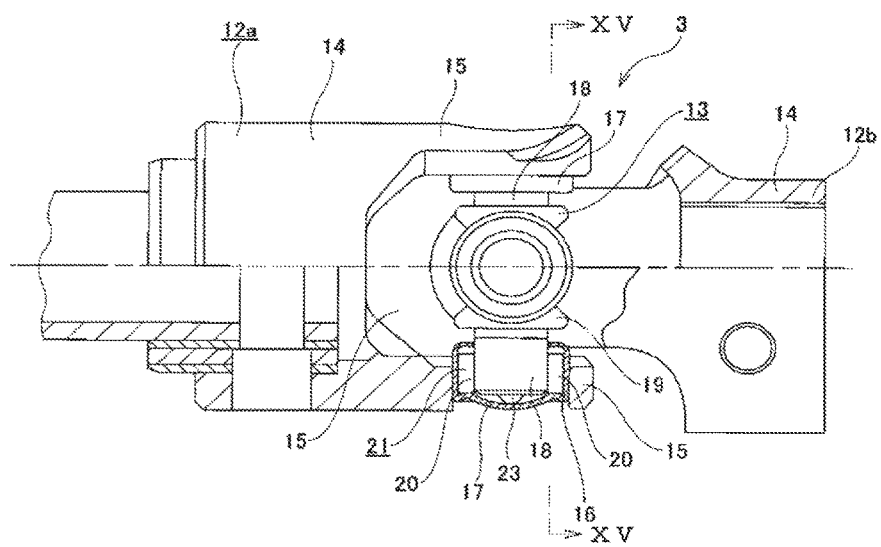
FIG. 14 is a partial cut side view, illustrating a first example of a known universal joint.
Figure 15:
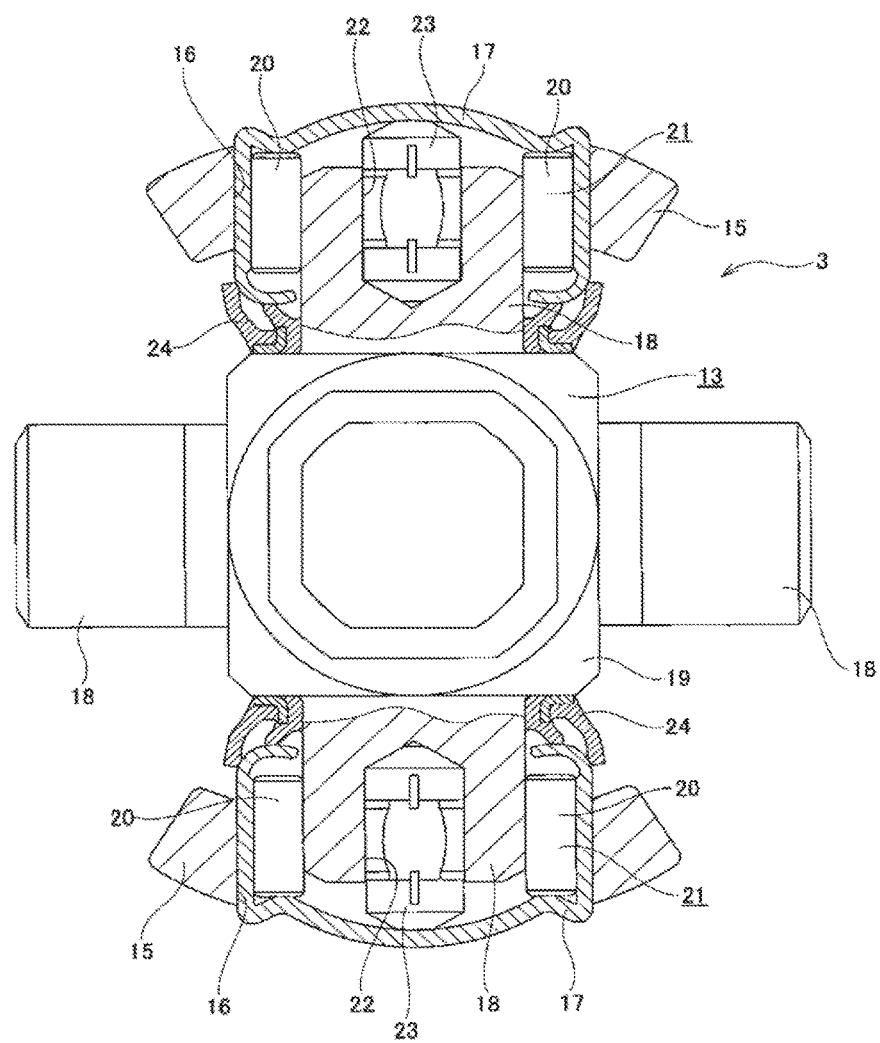
FIG. 15 is an enlarged sectional view taken along a line XV-XV of FIG. 14, in which some parts are omitted.
Figure 16:
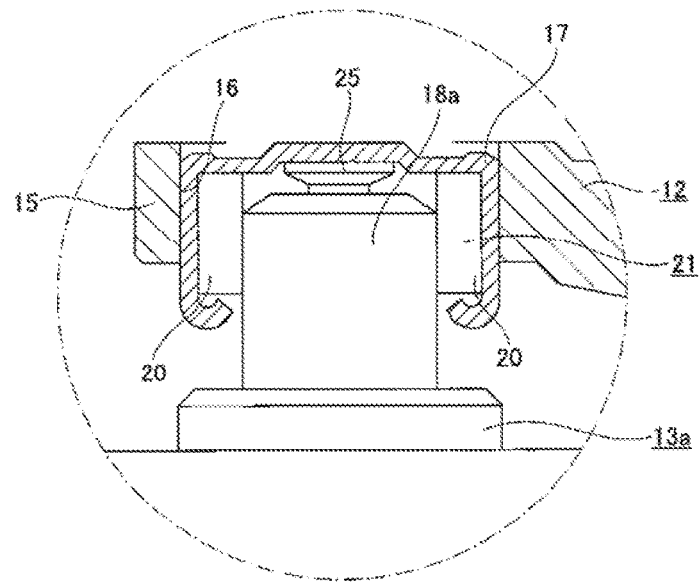
FIG. 16 is an enlarged sectional view of a main part, illustrating a second example of a known universal joint.
Figure 17A:
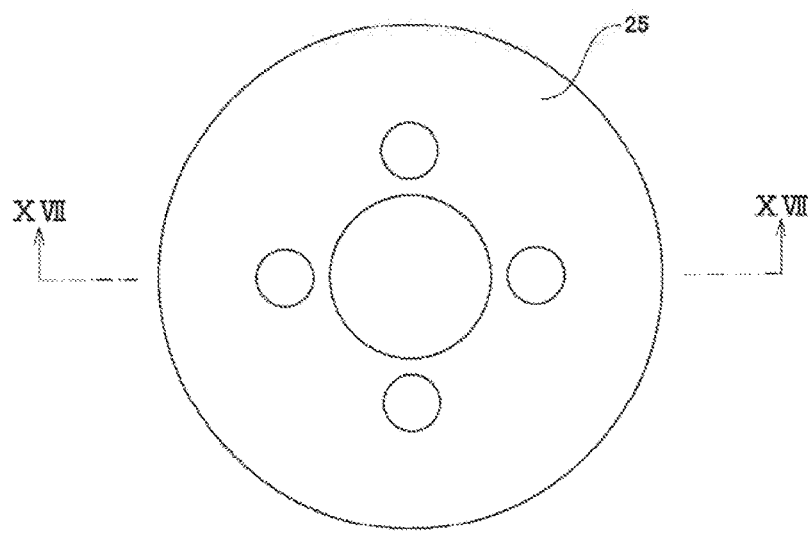
Figure 17B:
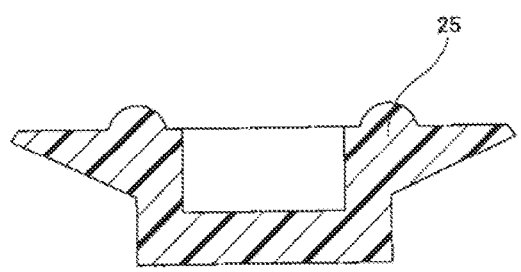

Similarly to the first example of the known structure shown in FIGS. 14 and 15, according to a universal joint 3c of this embodiment, center parts of respective shaft parts 18, 18 configuring a cross shaft 13 are formed with insertion holes 22, respectively. In the respective insertion holes 22, pins 23a, 23a corresponding to thrust pieces of the present invention are inserted. The respective shaft parts 18, 18 are rotatably supported in circular holes 16, 16, which are provided for coupling arm parts 15, 15 configuring both yokes 12, 12, through radial bearings 21, 21, so that the universal joint 3c is configured. At this state, the respective pins 23a, 23a are supported between respective bearing cups 17, 17 configuring the radial bearings 21, 21 and the respective shaft parts 18, 18, thereby preventing rattling of both the yokes 12, 12 relative to the cross shaft 13.

To this end, a bottom inner surface of each of the bearing cups 17, 17 is formed to have a partially spherical concave surface of which a center part of the bottom inner surface is most dented (a center of curvature is located on a center axis of each of the bearing cups 17, 17) in an axial direction of each of the shaft parts 18, 18, and an end surface (an upper surface in FIG. 2) of each of the pins 23a, 23a is formed to have a conical or circular truncated conical convex surface of which a center part of the end surface is most projected in the axial direction of each of the shaft parts 18, 18. That is, in this embodiment, the entire bottom inner surface of each of the bearing cups 17, 17 corresponds to a concave portion of the present invention, and the tip portion of each of the pins 23a, 23a corresponds to the convex portion of the present invention. The bottom inner surface of each of the bearing cups 17, 17 and the end surface of each of the pins 23a, 23a are contacted to each other with a fitting margin (in a state where each of the pins 23a, 23a is elastically compressed in the axial direction). In this embodiment, the fitting margin of each of the pins 23a, 23a to the bottom inner surface of each of the bearing cups 17, 17 is set to be about 1 to 500 μm. However, the fitting margin may also be set to be smaller than 1 μm (for example, 0) or the bottom inner surface of each of the bearing cups 17, 17 and the end surface of each of the pins 23a, 23a may be made to face each other with a slight gap therebetween. Incidentally, a value of the fitting margin at each state is a value at a room temperature state, which is a using state of the cross shaft universal joint.

In this embodiment, each of the pins 23a, 23a is made of a synthetic resin having elasticity and thermal plasticity such as polyphenylenesulfide resin (PPS), polyether ether ketone (PEEK), polyamide imide resin (PAI) and polyimide resin (PI), which has an appropriate thermal expansion rate (1 to $20 \times 10^{-5}/°$ C.) so that the fitting margin can be adjusted by heating to thermal expand or plastically deform the same and which has a small friction coefficient relative to the metal material configuring the cross shaft or respective bearing cups 17, 17 (a friction coefficient to the metal material is about 0.01 to 0.15) so as to suppress an increase in the rotational resistance of the respective radial bearings 21, 21.

The universal joint 3c of the above-described embodiment is manufactured as follows. First, the center parts of the respective shaft parts 18, 18 configuring the cross shaft 13 are formed with the insertion holes 22, respectively. In the respective insertion holes 22, the pins 23a, 23a made of the synthetic resin are inserted. Then, the respective shaft parts 18, 18 are inserted into the circular holes 16, 16 formed at the tip portions of the respective coupling arm parts 15, 15 configuring both the yokes 12, 12. Then, a plurality of needles 20, 20 are arranged on inner peripheries of the respective bearing cups 17, 17, which are made by performing punching processing or bending working using press working for a plate material of hard metal such as bearing steel and case-hardening steel, and the respective bearing cups 17, 17 are press-fitted and fixed in the respective circular holes 16, 16 from outer sides of the respective coupling arm parts 15, 15. At this time, the bottom inner surface of each of the bearing cups 17, 17 and the end surface of each of the pins 23a, 23a are contacted to each other with a fitting margin (at a state where each of the pins 23a, 23a is elastically compressed in the axial direction). Incidentally, after the respective needles 20, 20 are arranged in the respective bearing cups 17, 17, opening edge portions of the respective bearing cups 17, 17 are bent diametrically inwards to form inwardly-facing flange portions 26, 26 at the openings of the respective bearing cups 17, 17 so as to prevent the respective needles 20, 20 from being detached. Thereby, the respective radial bearings 21, 21 are mounted between the respective shaft parts 18, 18 and the respective coupling arm parts 15, 15. At this state, the fitting margin of each of the pins 23a, 23a to the bottom inner surface of each of the bearing cups 17, 17 is set to be about 2 to 1,000 μm, which is larger than the fitting margin after completion.

Then, the tip portions of the respective pins 23a, 23a are heated to about 40 to 250° C. (a temperature equal to or lower than a melting point (PPS: 275° C., PEEK: 334° C., PAI: 300° C.) of the synthetic resin configuring the respective pins 23a, 23a) through the bottoms of the respective bearing cups 17, 17. Specifically, the respective bearing cups 17, 17 are heated by generating heat with high frequency induction heating, by contacting the bottoms of the respective bearing cups 17, 17 with heated metal members and transferring heat or by heating the bottoms of the respective bearing cups 17, 17 with plasma, so that the tip portions of the respective pins 23a, 23a are heated. Then, the tip portions of the respective pins 23a, 23a are softened and are thus further plastically deformed. At this state, one yoke 12 of both the yokes 12, 12 is pivotally displaced relative to the other yoke 12 to relatively rotate the respective shaft parts 18, 18 (pins 23a, 23a supported to the shaft parts) relative to the respective bearing cups 17, 17, thereby enabling the bottom inner surfaces of the respective bearing cups 17, 17 and the end surfaces of the respective pins 23a, 23a to slidingly contact each other. Thereby, the tip portions of the respective pins 23a, 23a are plastically deformed to adjust the fitting margin to an appropriate size and to adjust shapes of the end surfaces of the respective pins 23a, 23a (the end surfaces are made to have a partially spherical shape conforming to the bottom inner surface of each of the bearing cups 17, 17). At the same time, center axes of the respective bearing cups 17, 17 and respective shaft parts 18, 18 are made to coincide with each other (to align each other), based on the engagement between the bottom inner surfaces of the respective bearing cups 17, 17 and the end surfaces of the respective pins 23a, 23a (by guiding the respective pins 23a, 23a by the bottom inner surfaces of the respective bearing cups 17, 17 to which the end surfaces of the respective pins 23a, 23a are sliding contacted). At this state, the tip portions of the respective pins 23a, 23a are cooled and solidified. The tip portions of the respective pins 23a, 23a may be gradually cooled by a natural cooling but are preferably cooled by a gas coolant such as low-temperature nitrogen gas, which is obtained by evaporating liquid nitrogen, or cooled by bringing jigs having cooling water circulating therein into contact with the bottoms of the respective bearing cups 17, 17 to remove heat therefrom since it is possible to easily manage a cooling temperature and a cooling time period.

Also, when heating/cooling the tip portions of the respective pins 23a, 23a, a temperature (heating temperature, cooling temperature) and a time period (heating time period, cooling time period) are adjusted so as to control a deformation amount to an appropriate value. That is, when a heating amount is large (heating temperature is high or heating time period is long) or when a cooling amount is small (cooling temperature is high or cooling time period is short), a deformation amount of the tip portion of each of the pins 23a, 23a is excessively increased and the fitting margin of each of the pins 23a, 23a to the bottom inner surface of each of the bearing cups 17, 17 is reduced, so that the rattling may occur between the respective bearing cups 17, 17 and the respective pins 23a, 23a. On the other hand, when the heating amount is small (heating temperature is low or heating time period is short) or when the cooling amount is large (cooling temperature is low or cooling time period is long), the fitting margin is increased, so that upon the torque transmission, the transmission loss may be increased or the high force may be applied to the respective bearing cups 17, 17 to deteriorate the endurance of the respective bearing cups 17, 17.

Also, in order to heat the respective pins 23a, 23a, before inserting the pins 23a, 23a into the respective insertion holes 22, the shaft parts 18, 18 of the cross shaft 13 may be first heated, and then the respective pins 23a, 23a may be inserted into the respective insertion holes 22 and heated. Thereafter, the respective shaft parts 18, 18 and the respective bearing cups 17, 17 may be assembled. In this case, instead of the above-described cooling method or after performing the cooling method, the heated shaft parts 18, 18 and pins 23a, 23a may be fitted with the respective bearing cups 17, 17 (which have been cooled in advance, as required) to remove the heat by the respective bearing cups 17, 17, so that the tip portions of the respective pins 23a, 23a may be cooled.

Further, before press-fitting the respective bearing cups 17, 17 into the respective circular holes 16, 16, the respective bearing cups 17, 17 and the respective pins 23a, 23a may be heated and the respective shaft parts 18, 18 and the respective bearing cups 17, 17 may be then assembled. Also in this case, the respective bearing cups 17, 17 may be fitted to the respective shaft parts 18, 18 to remove the heat by the respective shaft parts 18, 18, so that the tip portions of the respective pins 23a, 23a may be cooled.

Further, only the respective pins 23a, 23a may be heated. Also in this case, after assembling the universal joint 3c, the heat may be removed by the other members configuring the universal joint 3c, so that the tip portions of the respective pins 23a, 23a may be cooled.

The sizes of each of the pins 23a, 23a and the thrust piece can be adjusted by any of the above manufacturing methods, which is also the same in following embodiments.

According to the above manufacturing method of the cross shaft universal joint of the above embodiment, it is possible to reduce the manufacturing cost of the universal joint 3c while suppressing the rattling of the yokes 12, 12 relative to the cross shaft 13. That is, according to the universal joint 3c of this embodiment, the respective members configuring the universal joint 3c are assembled and then the tip portions of the pins 23a, 23a made of synthetic resin are heated or the respective pins 23a, 23a are heated in advance and then the respective members are assembled. Thereby, at the state where the respective pins 23a, 23a are softened, one yoke 12 of the yokes 12, 12 is pivotally displaced relative to the other yoke 12 to bring the bottom inner surfaces of the bearing cups 17, 17 configuring the radial bearings 21, 21 with sliding contact with the end surfaces of the respective pins 23a, 23a.

Accordingly, the tip portion of each of the pins 23a, 23a is plastically deformed to set the fitting margin of each of the pins 23a, 23a to each of the bearing cups 17, 17 to an appropriate size and to adjust the shape of the end surface of each of the pins 23a, 23a. Therefore, it is not necessary to excessively increase the shape precision and size precision of the respective pins 23a, 23a and the assembly precision of the cross shaft 13 and yokes 12, 12, so that it is possible to suppress the unnecessary increase in the manufacturing cost of the universal joint 3c. Also, it is possible to keep down the frictional resistance of the sliding contact part between the bottom inner surface of each of the bearing cups 17, 17 and each of the pins 23a, 23a and the rotational resistance of each of the radial bearings 21, 21 (the pivotal resistance of one yoke 12 relative to the other yoke 12). Also, as one yoke 12 is pivotally displaced relative to the other yoke 12, the tip portion of each of the pins 23a, 23a is moved along the bottom inner surface of each of the bearing cups 17, 17, so that the centers of the respective bearing cups 17, 17 and the respective shaft parts 18, 18 can be aligned. Also in this respect, therefore, it is not necessary to excessively increase the assembly precision of the cross shaft 13 and both the yokes 12, 12, so that it is possible to suppress the increase in the manufacturing cost of the universal joint 3c.

Second Embodiment

Figure 3:
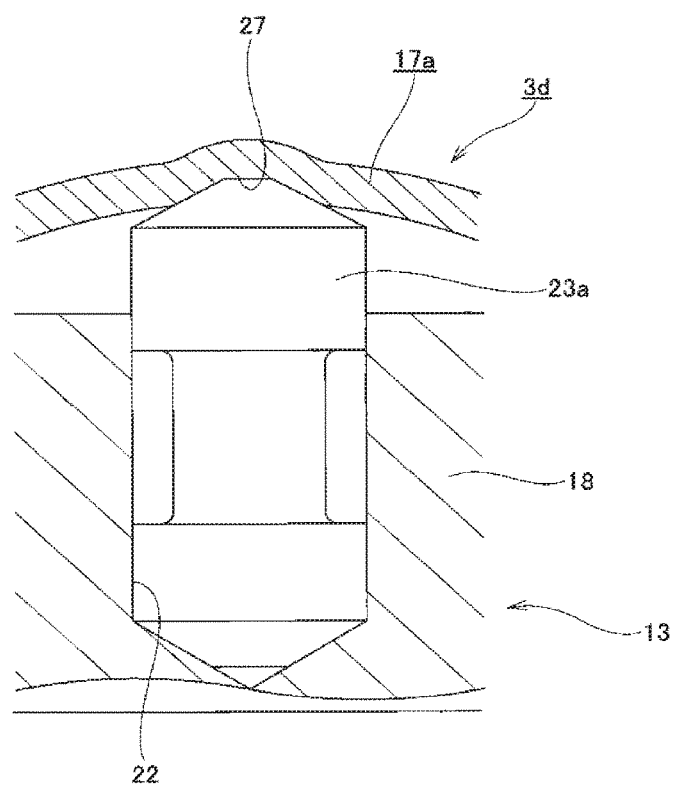
FIG. 3 is the same view as FIG. 2, illustrating a second embodiment of the present invention, in which a pin is shown without being cut.
Figure 4:
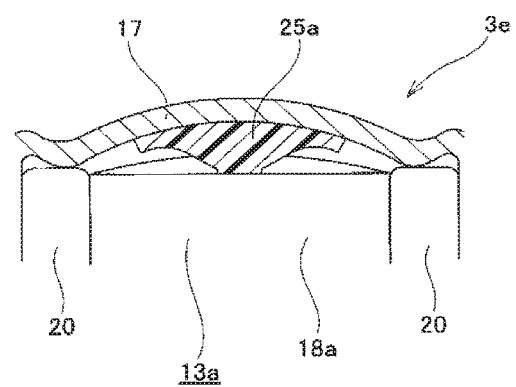
FIG. 4 is the same view as FIG. 2, illustrating a third embodiment of the present invention.

FIG. 3 illustrates a second embodiment of the present invention. According to a universal joint 3d of this embodiment, a center part of a bottom inner surface of a bearing cup 17a configuring the radial bearing 21 (refer to FIG. 1) is formed with a mortar-shaped concave portion 27 inclined in a direction in which an inner diameter is gradually increased towards an opening thereof. In this embodiment, at a state where the respective members configuring the universal joint 3d are assembled, the tip portion of the pin 23a inserted in the insertion hole 22 of the shaft part 18 configuring the cross shaft 13 is engaged with the concave portion 27. At this state, the tip portion of each pin 23a is heated and expanded to adjust the fitting margin to each bearing cup 17a, and the centers of the bearing cup 17a and the shaft part 15 are aligned based on the engagement between the concave portion 27 and the pin 23a. According to this embodiment, it is possible to align the centers with higher precision than the structure of the first embodiment.

Since the other configurations and operations are the same as the first embodiment, the overlapped illustration and descriptions are omitted.

Third Embodiment

FIGS. 4 and 5A to 5C illustrate a third embodiment of the present invention. According to a universal joint 3e of this embodiment, a thrust piece 25a having a substantially disc shape is interposed between the bottom inner surface of the bearing cup 17 configuring the radial bearing 21 (refer to FIG. 1) and an end surface of a shaft part 18a configuring a cross shaft 13a. That is, an outer surface (an upper surface in FIG. 4) of the thrust piece 25a has a partially spherical shape conforming to the bottom inner surface of the bearing cup 17, and an inner surface of the thrust piece 25a has a circular truncated conical shape inclined in a direction in which an outer diameter is gradually decreased towards a tip thereof. In this embodiment, the thrust piece 25a is made of the synthetic resin such as PPS, PEEK, PAI, PI and the like having an appropriate thermal expansion rate and a low friction coefficient, like the pin 23a (refer to FIGS. 1 and 2) of the first embodiment.

Figure 5A:
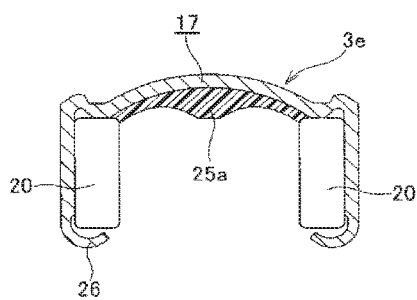
FIGS. 5A to 5C are partial sectional views illustrating a manufacturing method of a universal joint in a process order, in the third embodiment of the present invention.
Figure 5B:
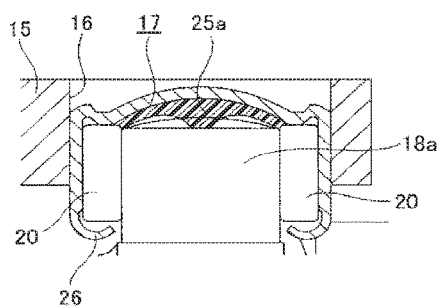
Figure 5C:
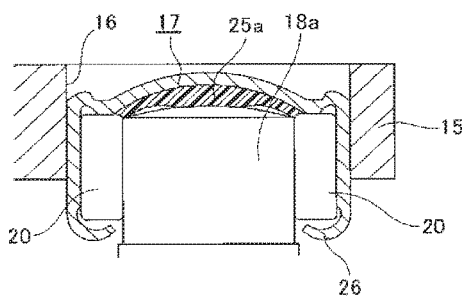

When manufacturing the universal joint 3e, the bearing cup 17 and the thrust piece 25a are heated by the same method as the first embodiment at a state where the thrust piece 25e is fixed to the bottom inner surface of the bearing cup 17, as shown in FIG. 5A. Then, as shown in FIG. 5B, the bearing cup 17 is fitted to the shaft part 18a. Then, one yoke 12 of the pair of yokes 12, 12 (refer to FIG. 1) is pivotally displaced relative to the other yoke 12 to bring the end surface of the shaft part 18a into sliding contact with an end surface of the thrust piece 25a. Thereby, as shown in FIGS. 5B and 5C, the end surface of the thrust piece 25a is plastically deformed to set the fitting margin of the thrust piece 25a to the bearing cup 17 to an appropriate size and to adjust the shape of the end surface of the thrust piece 25a. Also, the heat of the bearing cup 17 and the thrust piece 25a is removed by the shaft part 18a, so that the bearing cup 17 and the thrust piece 25a are cooled. In this case, the shaft part 18a may be cooled in advance, as required.

When performing this embodiment, the bearing cup 17 and the shaft part 18a may be heated at the assembled state or the thrust piece 25a and the shaft part 18a may be heated, like the first embodiment.

Since the other configurations and operations are the same as the first embodiment, the overlapped illustrations and descriptions are omitted.

Fourth Embodiment

Figure 6:
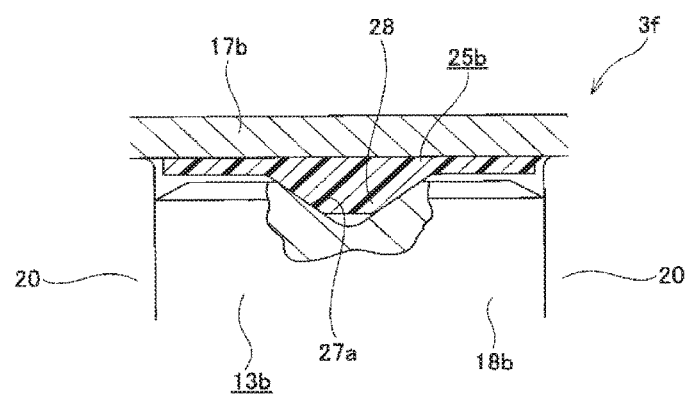
FIG. 6 is the same view as FIG. 2, illustrating a fourth embodiment of the present invention.

FIG. 6 illustrates a fourth embodiment of the present invention. According to a universal joint 3f of this embodiment, a center part of an end surface of a shaft part 18b configuring a cross shaft 13b is formed with a concave portion 27a inclined in a direction in which an inner diameter is gradually increased towards an opening thereof, and an inner surface of a thrust piece 25b facing the end surface is formed with a convex portion 28 having a substantially circular truncated conical shape inclined in a direction in which an outer diameter is gradually decreased towards a tip thereof, so that the concave portion 27a and the convex portion 28 are engaged with each other. When manufacturing the universal joint 3f as described above, the thrust piece 25b is supported to a center part of a bottom inner surface of a bearing cup 17b and the shaft part 18b is inserted in the bearing cup 17b, so that the concave portion 27a and the convex portion 28 are engaged with each other. At this state, the thrust piece 25b is heated and one yoke 12 of the pair of yokes 12, 12 (refer to FIG. 1) is pivotally displaced relative to the other yoke 12 to deform the thrust piece 25b. Thereby, the fitting margin between the concave portion 27a and the convex portion 28 is adjusted to an appropriate size, and the center axes of the shaft part 18b and the bearing cup 17b are aligned based on the engagement between the concave portion 27a and the convex portion 28.

Since the other configurations and operations are the same as the first to third embodiments, the overlapped illustrations and descriptions are omitted.

Fifth Embodiment

Figure 7:
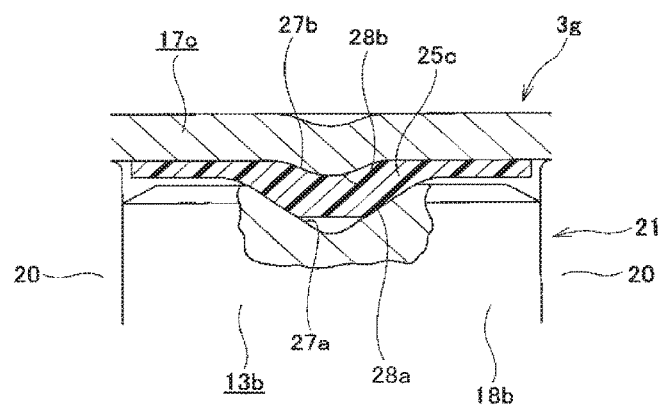
FIG. 7 is the same view as FIG. 2, illustrating a fifth embodiment of the present invention.

FIG. 7 illustrates a fifth embodiment of the present invention. According to a universal joint 3g of this embodiment, the center part of the end surface of the shaft part 18b configuring the cross shaft 13b is formed with the concave portion 27a, and a center part of an inner surface of a thrust piece 25c is formed with a convex portion 28a, so that the concave portion 27a and the convex portion 28a are engaged with each other, like the fourth embodiment. Also, in this embodiment, a center part of an outer surface of the thrust piece 25c is formed with a concave portion 27b and a center part of a bottom inner surface of a bearing cup 17c configuring the radial bearing 21 is formed with a convex portion 28b, so that the concave portion 27b and the convex portion 28b are engaged with each other. In this embodiment, since it is not necessary to support the thrust piece 25c to the center part of the bottom inner surface of the bearing cup 17c with the center axes thereof being aligned in advance, it is possible to easily perform the assembling operation.

Since the other configurations and operations are the same as the fourth embodiment, the overlapped illustrations and descriptions are omitted.

Sixth Embodiment

Figure 8:
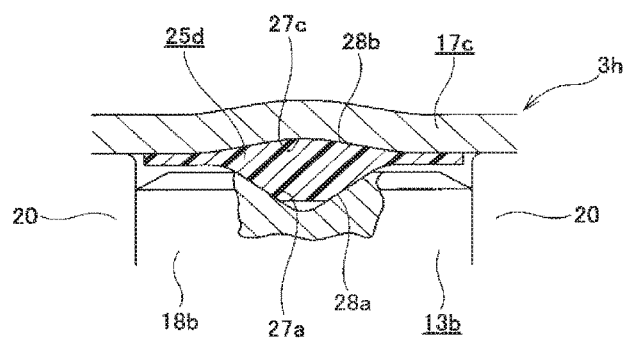
FIG. 8 is the same view as FIG. 2, illustrating a sixth embodiment of the present invention.

FIG. 8 illustrates a sixth embodiment of the present invention. According to a universal joint 3h of this embodiment, the center part of the end surface of the shaft part 18b configuring the cross shaft 13b is formed with the concave portion 27a, and a center part of an inner surface of a thrust piece 25d is formed with a convex portion 28a, so that the concave portion 27a and the convex portion 28a are engaged with each other, like the fourth and fifth embodiments. Also, in this embodiment, a center part of an outer surface of the thrust piece 25d is formed with a convex portion 28b and the center part of the bottom inner surface of the bearing cup 17c configuring the radial bearing 21 (refer to FIG. 1) is provided with a concave portion 27c, so that the concave portion 27c and the convex portion 28b are engaged with each other.

Since the other configurations and operations are the same as the fifth embodiment, the overlapped illustrations and descriptions are omitted.

Seventh Embodiment

Figure 9:
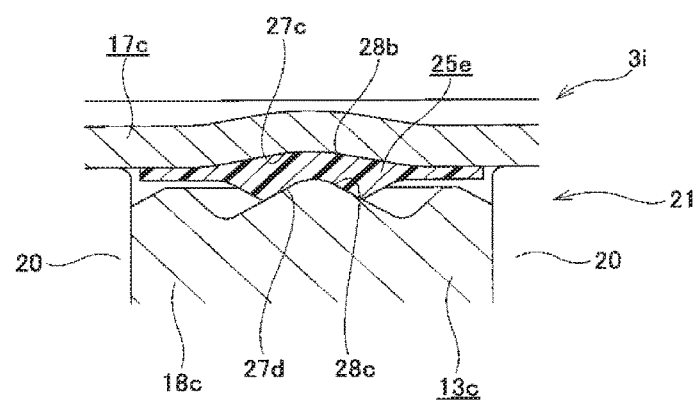
FIG. 9 is the same view as FIG. 2, illustrating a seventh embodiment of the present invention.

FIG. 9 illustrates a seventh embodiment of the present invention. According to a universal joint 3i of this embodiment, a center part of an outer surface of a thrust piece 25e is formed with a convex portion 28b, and the center part of the inner surface of the bearing cup 17c configuring the radial bearing 21 is formed with a concave portion 27c, so that the concave portion 27c and the convex portion 28b are engaged with each other, like the sixth embodiment. Also, in this embodiment, a center part of an end surface of a shaft part 18c configuring a cross shaft 13c is formed with a convex portion 28c and a center part of an inner surface of the thrust piece 25e is formed with a concave portion 27d, so that the concave portion 27d and the convex portion 28c are engaged with each other.

Since the other configurations and operations are the same as the sixth embodiment, the overlapped illustrations and descriptions are omitted.

Eighth Embodiment

Figure 10:
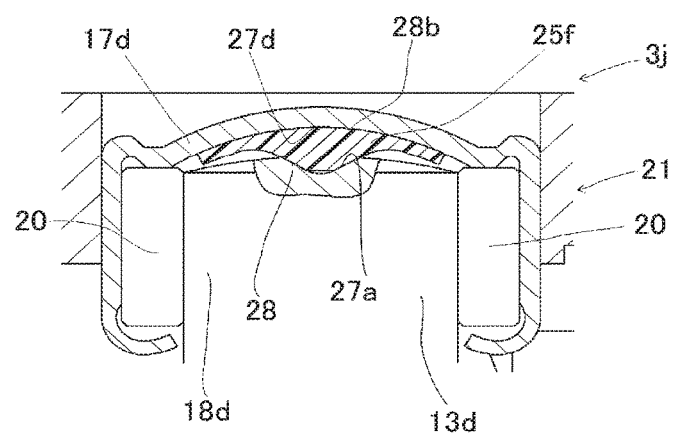
FIG. 10 is the same view as FIG. 2, illustrating an eighth embodiment of the present invention.

FIG. 10 illustrates an eighth embodiment of the present invention. According to a universal joint 3j of this embodiment, a thrust piece 25f having a substantially disc shape is interposed between a bottom inner surface of a bearing cup 17d configuring the radial bearing 21 (refer to FIG. 1) and an end surface of a shaft part 18d configuring a cross shaft 13d. That is, an outer surface (an upper surface in FIG. 10) of the thrust piece 25f is configured as a convex portion 28b having a partially spherical shape conforming to the bottom inner surface of the bearing cup 17d, and an inner surface of the thrust piece 25f is configured as a convex portion 28 having a circular truncated conical shape inclined in a direction in which an outer diameter is gradually decreased towards a tip thereof. A center part of the end surface of the shaft part 18d is formed with a mortar-shaped concave portion 27a inclined in a direction in which an inner diameter is gradually increased towards an opening thereof, which is engaged with the convex portion 28. According to this embodiment, since the outer surface of the thrust piece 25f has the partially spherical shape conforming to the bottom inner surface of the bearing cup 17d, the center axes can be easily aligned simply by inserting the thrust piece 25f into the bearing cup 17d. Also, when assembling the bearing cup 17d and the shaft part 18d, since the convex portion 28 and the concave portion 27a are inclined each other, they can be easily fitted. Therefore, the assembling operation can be easily performed.

Ninth Embodiment

Figure 11:
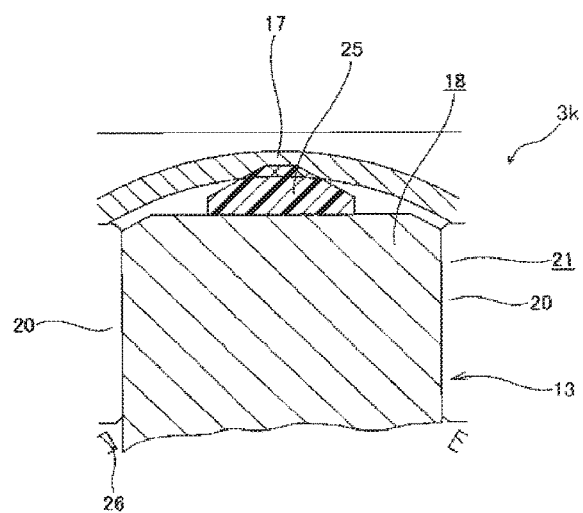
FIG. 11 is the same view as FIG. 2, illustrating a ninth embodiment of the present invention.
Figure 12:
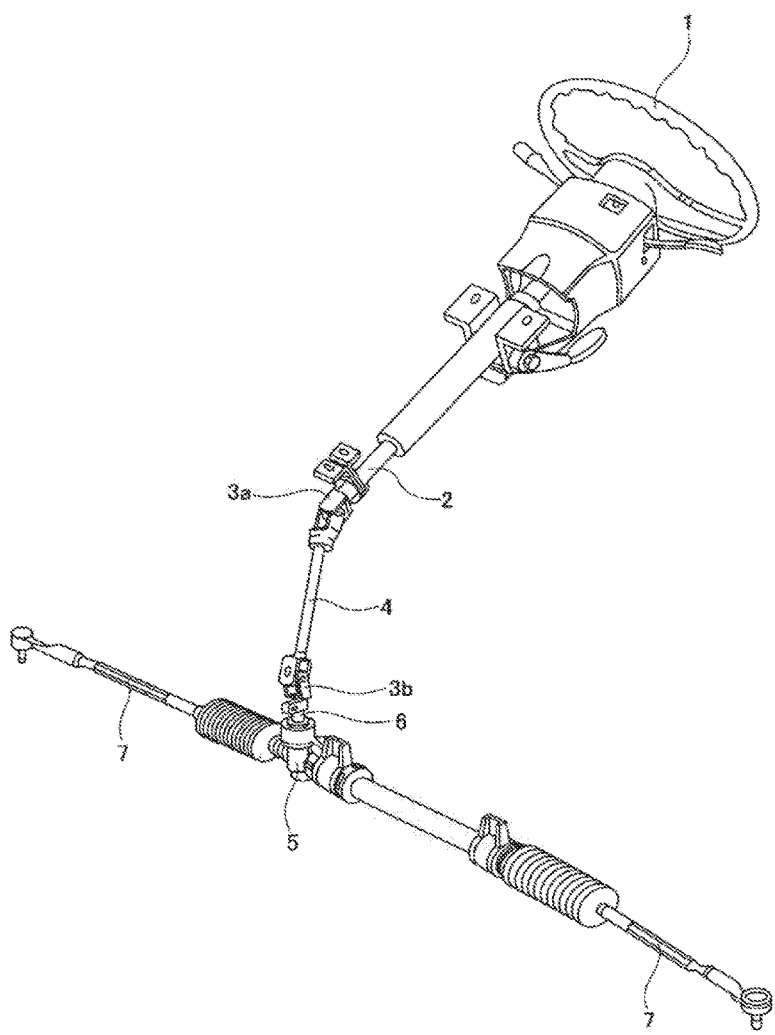
FIG. 12 is a perspective view of a main part, illustrating an example of a known steering apparatus.
Figure 13:
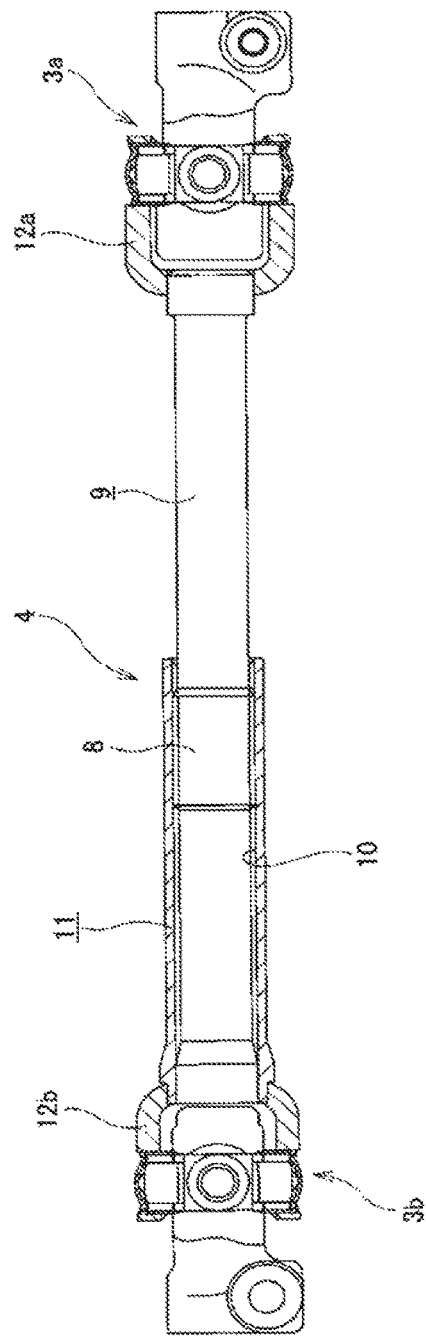
FIG. 13 is a partial cut side view, illustrating an intermediate shaft.

FIG. 11 illustrates a ninth embodiment of the present invention. According to a universal joint 3k of this embodiment, the insertion hole 22 of the first embodiment is not provided. Thus, the shape of the pin 23a is configured as the shape of the thrust piece 25 in which the part of the pin 23a inserted in the insertion hole 22 is omitted.

Also in this embodiment, after completing the assembling of the universal joint 3k, the tip portion of the thrust piece 25 is heated to about 40 to 250° C. (a temperature equal to or lower than the melting point (PPS: 275° C., PEEK: 334° C., PAI: 300° C.) of the synthetic resin configuring the respective thrust pieces 25) through the bottom of each of the bearing cups 17, 17, so that it is softened and is further plastically deformed.

Also, before fitting the respective thrust pieces 25, the shaft parts 18, 18 of the cross shaft 13 may be heated and then the respective shaft parts 18, 18 and the respective bearing cups 17, 17 may be assembled. Alternatively, before press-fitting the respective bearing cups 17, 17 into the respective circular holes 16, 16, the respective bearing cups 17, 17 and the respective thrust pieces 25 may be heated and then the respective shaft parts 18, 18 and the respective bearing cups 17, 17 may be assembled.

Also in this embodiment, the center part of the bottom inner surface of the bearing cup 17 may be formed with a mortar-shaped concave portion 27, and the respective concave portions 27 and the tip portions of the thrust pieces 25 may be engaged at a state where the respective members configuring the universal joint 3k are assembled, like the second embodiment. As this state, the tip portion of the thrust piece 25 may be heated and expanded to adjust the fitting margin to each bearing cup 17a and the centers of the bearing cup 17 and the shaft part 18 may be aligned based on the engagement between the concave portion 27 and the thrust piece 25.

In this embodiment, since it is not necessary to form the insertion holes 22 at the four shaft parts 18, it is possible to save the processing cost.

INDUSTRIAL APPLICABILITY

According to the respective embodiments, the radial bearing mounted between the circular hole of the yoke and the shaft part of the cross shaft is configured by the radial needle bearing. However, the radial bearing may also be configured by other radial rolling bearing such as a radial ball bearing configured by arranging a plurality of balls between the outer periphery of the shaft part and the inner periphery of the bearing cup fitted and fixed in the circular hole. Also, the radial bearing may be configured by a radial sliding bearing having a cylindrical sleeve, which is made of a low friction material such as synthetic resin and oil impregnated metal, arranged between both circumferential surfaces.

Further, in case of mounting the universal joint of the present invention to a steering apparatus for an automobile, when mounting the universal joint to an outside of a vehicle interior, a seal ring may be arranged between a base end portion of the shaft part of the cross shaft and an opening edge portion of the bearing cup.

Further, the method of the present invention to adjust the size of the thrust piece may be applied to all of the four thrust pieces. However, the present invention is not limited thereto. For example, the method of the present invention may be applied to one or more thrust pieces.

For example, among the four thrust pieces, the method of the present invention may be applied to any one thrust piece of the two thrust pieces arranged between the bearing cup and the shaft part in correspondence to one yoke and any one thrust piece of the two thrust pieces arranged between the bearing cup and the shaft part in correspondence to the other yoke.

In the above embodiments, as described above, the size of the thrust piece in the axial direction of the shaft part is adjusted to an appropriate size by any one of following methods.

(i) At a state where the pair of yokes, the cross shaft, the respective radial bearings and the respective thrust pieces are assembled, at least one of the thrust pieces is heated and deformed.

(ii) At a state before at least one of the thrust pieces is arranged between the bearing cup and the shaft part, the shaft part to which the thrust piece is arranged is heated, and then the thrust piece and the shaft part are assembled. Thereafter, the bearing cup and the shaft part are assembled, so that the thrust piece is heated and deformed.

(iii) At a state before the respective bearing cups and the cross shaft are assembled, at least one of the thrust pieces and the bearing cup to which the thrust piece is arranged are heated. Thereafter, the respective bearing cups and the cross shaft are assembled. so that the thrust piece is deformed.

However, the present invention may be any method other than the above-described method, inasmuch as when assembling the cross shaft universal joint, at least one of the thrust pieces is heated and deformed directly or through the bearing cup or cross shaft and the size of the thrust piece in the axial direction of the shaft part is thus adjusted.

The present application is based on Japanese Patent Application No. 2013-178822 filed on Aug. 30, 2013, Japanese Patent Application No. 2014-109 filed on Jan. 6, 2014, Japanese Patent Application No. 2014-79904 filed on Apr. 9, 2014 and Japanese Patent Application No. 2014-108656 filed on May 27, 2014, the subject maters of which are incorporated herein by reference.

DESCRIPTION OF REFERENCE NUMERALS

1: steering wheel
2: steering shaft
3, 3a to 3i: universal joint
4: intermediate shaft
5: steering gear unit
6: input shaft
7: tie rod
8: male spline part
9: inner shaft
10: female spline part
11: outer tube
12, 12a, 12b: yoke
13, 13a, 13b: cross shaft
14: base part
15: coupling arm part
16: circular hole
17, 17a to 17c: bearing cup
18, 18a to 18c: shaft part
19: coupling base part
20: needle
21: radial bearing
22: insertion hole
23, 23a: pin
24: seal ring
25, 25a to 25e: thrust piece
26: inwardly-facing flange portion
27, 27a to 27d: concave portion
28, 28a to 28c: convex portion

The invention claimed is:

1. A method of manufacturing a cross shaft universal joint including a pair of yokes, a cross shaft, four radial bearings and four thrust pieces,
   wherein each of the pair of yokes includes a base part for coupling and fixing an end portion of a rotary shaft, a pair of coupling arm parts extending axially from two diametrically opposite positions of the rotary shaft at one axial end edge of the base part, and a pair of circular holes formed at tip portions of the pair of coupling arm parts to be concentric with each other,
   wherein the cross shaft is configured by radially fixing four shaft parts on an outer periphery of a coupling base part thereof,
   wherein each of the radial bearings is arranged between an inner periphery of a cylindrical bottomed bearing cup fitted and fixed in a corresponding circular hole and an outer periphery of a shaft part, of the shaft parts, and is configured to support a radial load applied between the bearing cup and the shaft part, and
   wherein each of the thrust pieces is made of a synthetic resin and arranged between a bottom inner surface of the bearing cup and the shaft part,
   the method comprising:
   when assembling the cross shaft universal joint, heating and plastically deforming at least one thrust piece, of the thrust pieces, to adjust a size of the thrust piece in an axial direction of the shaft part,
   wherein a center part of an end surface of the thrust piece is provided with a convex portion, a center of which is a most projected portion of the thrust piece in the axial direction, and a center part of a surface of the bearing cup facing the end surface of the thrust piece is provided with a concave portion, a center of which is a most dented portion of the bearing cup in the axial direction, enabling the convex portion to slidingly contact the concave portion, and
   wherein center axes of the shaft part and the radial bearings are aligned based on engagement between the convex portion and the concave portion.

2. The method according to claim 1,
   wherein at a state where the pair of yokes, the cross shaft, the radial bearings and the thrust pieces are assembled, the thrust piece is heated and deformed to adjust the size of the thrust piece in the axial direction of the shaft part.

3. The method according to claim 1,
   wherein at a state before the thrust piece is arranged between the bearing cup and the shaft part, the shaft part to which the thrust piece is arranged is heated, and the thrust piece and the shaft part are assembled, and thereafter, the bearing cup and the shaft part are assembled, so that the thrust piece is heated and deformed to adjust the size of the thrust piece in the axial direction of the shaft part.

4. The method according to claim 1,
wherein at a state before a plurality of bearing cups, including the bearing cup, and the cross shaft are assembled, the thrust piece and the bearing cup to which the thrust pieces are arranged are heated, and thereafter, the bearing cups and the cross shaft are assembled, so that the thrust piece is deformed to adjust the size of the thrust piece in the axial direction of the shaft part.

5. The method according to claim 1,
wherein the thrust piece has a fitting margin to the bearing cup and the shaft part, and a size of the fitting margin at a state before the thrust piece is heated is larger than that of the fitting margin after the heating.

6. The method according to claim 1,
wherein at a state where the thrust piece is heated and the convex portion and the concave portion are engaged with each other, one yoke of the pair of yokes is pivotally displaced relative to another yoke, of the pair of yokes.

7. The method according to claim 1,
wherein the thrust piece is arranged between the bottom inner surface of the bearing cup and an end surface of the shaft part, and
wherein the thrust piece has a substantially disc shape which has an outer surface of a partially spherical shape conforming to the bottom inner surface of the bearing cup and an inner surface of a circular truncated conical shape inclined in a direction in which an outer diameter is gradually decreased towards a tip thereof.

8. The method according to claim 1,
wherein the pair of yokes comprise a first yoke and a second yoke, and
wherein the method further comprises:
  pivotally displacing the first yoke relative to the second yoke such that the convex portion of the thrust piece is moved along a bottom inner surface of the concave portion of the bearing cup and such that the center part of the bearing cup is aligned with at least a center axis, of the center axes, of the shaft part.

* * * * *